United States Patent
Srinivasan et al.

(10) Patent No.: US 12,204,580 B2
(45) Date of Patent: Jan. 21, 2025

(54) AUTOMATED CONTACT CREATION BASED ON CONTENT COMMUNICATIONS

(71) Applicant: Adeia Guides Inc., San Jose, CA (US)

(72) Inventors: Madhusudhan Srinivasan, Bangalore (IN); Deviprasad Punja, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 619 days.

(21) Appl. No.: 16/457,225

(22) Filed: Jun. 28, 2019

(65) Prior Publication Data

US 2020/0409926 A1 Dec. 31, 2020

(51) Int. Cl.
*G06F 16/383* (2019.01)
*G06F 16/23* (2019.01)

(52) U.S. Cl.
CPC ........ *G06F 16/383* (2019.01); *G06F 16/2358* (2019.01)

(58) Field of Classification Search
CPC ............................ G06F 16/383; G06F 16/2358
See application file for complete search history.

(56) References Cited

U.S. PATENT DOCUMENTS

| | | | |
|---|---|---|---|
| 10,489,387 B1 * | 11/2019 | Rogynskyy | G06F 40/237 |
| 2004/0093317 A1 | 5/2004 | Swan | |
| 2006/0259551 A1 | 11/2006 | Caldwell | |
| 2010/0216442 A1 | 8/2010 | Kim | |
| 2012/0004015 A1 | 1/2012 | Le Thierry D'Ennequin | |
| 2012/0226704 A1 * | 9/2012 | Boland | G06F 16/9535 707/749 |
| 2014/0006970 A1 * | 1/2014 | Casey | H04L 51/32 715/753 |
| 2014/0214895 A1 | 7/2014 | Higgins et al. | |
| 2015/0081697 A1 * | 3/2015 | Ng | H04L 51/32 707/736 |
| 2015/0089354 A1 * | 3/2015 | Abrahami | G06F 16/958 715/235 |
| 2015/0100356 A1 * | 4/2015 | Bessler | G06Q 10/0631 705/7.12 |

(Continued)

OTHER PUBLICATIONS

Amit Agarwal, "How to Extract Email Addresses from your Gmail Messages in Gmail," Internet article, May 26, 2016 retrieved from the Internet: URL:https://www.labnol.org/internet/extrac t-gmail-addresses/28037/ [retrieved on Aug. 12, 2020] pp. 1-4.

(Continued)

*Primary Examiner* — Christopher J Raab
(74) *Attorney, Agent, or Firm* — Haley Guiliano LLP

(57) ABSTRACT

Systems and methods for automated contact generation based on content communications are disclosed herein. A rule is retrieved from a rules database, the rule defining criteria for identifying contact-related data within a content item electronically communicated from a source account to a destination account. Based on the rule, the contact-related data within the content item is identified. In response to identifying the contact-related data within the content item, the contact-related data is automatically extracted from the content item, a contact entry corresponding to the source account is automatically generated based on the extracted contact-related data, and the contact entry is automatically stored for the destination account in a contact database.

19 Claims, 8 Drawing Sheets

(56) References Cited

U.S. PATENT DOCUMENTS

| | | | |
|---|---|---|---|
| 2015/0134389 A1* | 5/2015 | Punera | G06N 5/00 |
| | | | 705/7.15 |
| 2015/0287099 A1* | 10/2015 | Soundararajan | G06F 16/9535 |
| | | | 705/14.72 |
| 2015/0358447 A1* | 12/2015 | Horling | G06F 16/951 |
| | | | 455/414.1 |
| 2016/0099903 A1 | 4/2016 | Dabney et al. | |
| 2016/0099904 A1* | 4/2016 | Agathangelos | G06Q 10/107 |
| | | | 709/206 |
| 2017/0005954 A1 | 1/2017 | Shaltiel et al. | |
| 2017/0124034 A1 | 5/2017 | Upadhyay et al. | |
| 2017/0169013 A1* | 6/2017 | Sarikaya | G06F 16/3331 |
| 2018/0131644 A1 | 5/2018 | Bueker et al. | |
| 2020/0125669 A1* | 4/2020 | Subedi | G06F 9/4887 |
| 2020/0211077 A1* | 7/2020 | He | G06Q 30/0611 |

OTHER PUBLICATIONS

Mapilab: "How to create Outlook contacts automatically when sending or replying to email", Internet article, Aug. 10, 2015, Retrieved from the Internet: URL:https://www.mapilab.com/blog/create-ou tlook-contacts-automatically/ [retrieved on Aug. 12, 2020], pp. 1-5.

International Search Report and Written Opinion of PCT/US2020/039958 dated Aug. 25, 2020.

\* cited by examiner

AUTOMATED CONTACT CREATION BASED ON CONTENT COMMUNICATIONS

BACKGROUND

The present disclosure relates to management of contact databases and, more particularly, to systems and related processes for automatically creating, deleting, and/or updating contact entries based on content communications.

SUMMARY

A user receives, from a variety of sources via their smartphones or other computing devices, countless messages or other types of content communications, such as text messages, emails, phone calls, or the like, that potentially include or reference details regarding a person or that the user may wish to add as a contact in their contact database. To do so using conventional methods, the user is typically required to manually extract the contact-related information from the message and store the extracted information as a contact entry in their contact database or application. Additionally, over the course of time, in the interest of keeping their contact database up-to-date, the user may wish to delete the contact entry from their contact database for a variety of reasons, such as, for instance, because the user no longer interacts with the person. To do so using conventional methods, the user is typically required to manually delete the contact entry from their contact database. Since such manual creation and deletion of contact entries can be time-consuming and laborious, users often do not create such contacts. In such circumstances, if a user receives a message, such as a phone call, from a source, the user might ignore the caller as an unknown source.

In view of the foregoing, the present disclosure provides systems and related methods that are able to automatically, without requiring manual user input, create and delete contact entries for a contact database, by analyzing content communications and/or other contextual information received via the user's account. In one example, the present disclosure provides a system for automated contact generation based on content communications. The system comprises a communication port, a rules database, a contact database, and control circuitry. The communication port is configured to receive, via a communication network, a content item communicated from a source account to a destination account. Example types of the content item include a calendar event notice, a mobile application message, a text message, an email message, a chat-based message, and/or a social-media-based message. Example types of the source account and/or the destination account include a telephone account, an email account, a chat account, a mobile application account, and/or a social media account.

The rules database is configured to store a rule defining criteria for identifying contact-related data within the content item. The control circuitry is configured to retrieve the rule from the rules database and identify, based on the rule, the contact-related data within the content item. In response to identifying the contact-related data within the content item, the control circuitry is configured to automatically extract the contact-related data from the content item, generate, based on the extracted contact-related data, a contact entry corresponding to the source account, and store, for the destination account, the contact entry in the contact database.

In another example, the control circuitry is configured to identify, based on the rule, contextual information in the content item, and add a context identifier to the contact entry based on the contextual information. In some aspects, the contextual information comprises an identifier of a service provider scheduled to provide a service, and wherein the context identifier comprises an identifier of the service provider or of a type of the service.

In a further aspect, the control circuitry is configured to identify, based on the rule, contextual information in the content item. Based on the contextual information, the control circuitry is configured to search a second source for additional contact-related data corresponding to the source account and store the additional contact-related data in the contact entry. The contextual information, in some instances, comprises an identifier of a service provider, in which case the control circuitry may be configured to search the second source by searching a website of the service provider.

In still another example, the rule identifies one or more fields of the content item and one or more terms or phrases that signal presence of contact-related data. In such an example, the control circuitry is configured to analyze the content item by searching the one or more fields of the content item for the one or more terms or phrases.

The control circuitry, in some aspects, is configured to store, in the rules database, content item type identifiers, content item fields for each of the content item type identifiers, and keywords or phrases for each of the content item fields. In such aspects, the control circuitry retrieves the rule from the rules database based on matching the content item to at least one of the content item type identifiers stored in the rules database, matching a field of the content item to at least one of the content item fields stored in the rules database, and/or matching a keyword or phrase in the content item to at least one of the keywords or phrases stored in the rules database.

In still a further example, the control circuitry is configured to determine a type of the content item, select one of a plurality of independently executable plugins that corresponds to the type of the content item, and activate the selected plugin to perform at least one of the retrieving of the rule, the identifying of the contact-related data, the extracting of the contact-related data, the generating the contact entry, or the storing the contact entry.

The control circuitry, in some instances, be further configured to receive, at a computing device, after the content item has been electronically communicated from the source account to the destination account, a message from the source account to the destination account, which the message comprising an email message, a text message, a chat message, and/or a telephone call. In such instances, the control circuitry is configured to generate, for display via the computing device, the contact entry as an identifier of the source account.

In another example, the present disclosure provides a system for automated contact deletion based on content communications. The system comprises a communication port and control circuitry. The communication port is configured to receive, via a communication network, a content item communicated from a source account to a destination account. Example types of the content item include a calendar event notice, a mobile application message, a text message, an email message, a chat-based message, and/or a social-media-based message. Example types of the source account and/or the destination account include a telephone account, an email account, a chat account, a mobile application account, and/or a social media account.

The control circuitry is configured to generate, based on the content item, a contact deletion trigger defining a criterion for deleting a contact entry that identifies the source account and is stored for the destination account in a contact database. Based on the contact deletion trigger, the control circuitry determines whether the criterion for deleting the contact entry has been met. In response to determining that the criterion for deleting the contact entry has been met, the control circuitry is configured to automatically cause the contact entry to be deleted from the contact database. In another example, the control circuitry is configured to, in response to determining that the criterion for deleting the contact entry has been met, automatically cause the contact entry to be deleted from a plurality of contact databases that are stored for the destination account in at least one of a cloud storage or a local computing device storage.

In another example, the control circuitry is configured to retrieve, from a rules database, a rule defining criteria for identifying contact deletion trigger-related data within the content item. Based on the rule, the control circuitry identifies the contact deletion trigger-related data within the content item, and the contact deletion trigger is generated based on the contact deletion trigger-related data identified within the content item. In one aspect, the rule identifies one or more fields of the content item and one or more terms or phrases that signal presence of contact deletion trigger-related data. In such an aspect, the control circuitry is configured to identify the contact deletion trigger-related data within the content item by searching the one or more fields of the content item for the one or more terms or phrases. In a further aspect, the control circuitry is configured to match, based on the content item, the source account to the contact entry that identifies the source account and is stored for the destination account in the contact database.

In a further aspect, the contact deletion trigger is a time-based trigger, and the control circuitry is configured to determine whether the criterion for deleting the contact entry has been met by determining whether a current time as reached a contact entry deletion time. As another example, the contact deletion trigger may be an action-based trigger, in which case the control circuitry may be configured to determine whether the criterion for deleting the contact entry has been met by determining whether an action has occurred.

The control circuitry, in yet another aspect, is configured to identify a date and/or a time within the content item. Based on the date and/or the time, the control circuitry is configured to generate, as the criterion for deleting the contact entry, a day and/or a time for deleting the contact entry.

As another example, the control circuitry may be configured to identify, based on the content item, a service to be provided by a service provider. In such an example, the control circuitry may further be configured to determine whether the criterion for deleting the contact entry has been met by determining, based on a confirmation message, whether the service has been provided.

In another example, the present disclosure provides a system for automatically updating a contact entry based on content communications. The system comprises a communication port, a rules database, a contact database, and control circuitry. The communication port is configured to receive, via a communication network, a content item communicated from a source account to a destination account. The rules database is configured to store a rule defining criteria for identifying contact-related data within the content item. The control circuitry is configured to: retrieve the rule from the rules database and, based on the rule, identify the contact-related data within the content item. In response to identifying the contact-related data within the content item, the control circuitry automatically searches, based on the contact-related data, the contact database for a contact entry that corresponds to the source account; determines whether the contact entry should be updated based on the contact related data; and in response to determining that the contact entry should be updated, updates the contact entry in the contact database based on the contact-related data.

In some aspects, the control circuitry is further configured to search, based on the contact-related data, an archived contact database for the contact entry that corresponds to the source account. In such aspects, the updating of the contact entry in the contact database comprises retrieving an item of data from the contact entry in the archived contact database and storing the retrieved item of data in the contact entry in the contact database.

In one example, the control circuitry is further configured to update the contact entry by overwriting one or more fields of the contact entry with at least a portion of the contact-related data.

In another aspect, the control circuitry is further configured to identify, based on the rule, contextual information in the content item and update the contact entry by adding a context identifier to the contact entry based on the contextual information. The contextual information, in some examples, comprises an identifier of a service provider scheduled to provide a service, and wherein the context identifier comprises an identifier of the service provider or of a type of the service.

As another example, the control circuitry may be further configured to identify contextual information in the content item based on the rule. Based on the contextual information, the control circuitry searches a second source for additional contact-related data corresponding to the source account. The control circuitry then updates the contact entry by storing the additional contact-related data in the contact entry. The contextual information, in such an example, may comprise an identifier of a service provider, in which case the control circuitry may be further configured to search the second source by searching a website of the service provider.

In some instances, the rule identifies one or more fields of the content item and one or more terms or phrases that signal presence of contact-related data, and the control circuitry is further configured to analyze the content item by searching the one or more fields of the content item for the one or more terms or phrases.

The control circuitry, as another example, may be further configured to store, in the rules database, content item type identifiers, content item fields for each of the content item type identifiers, and keywords or phrases for each of the content item fields. The control circuitry, in such an example, may be further configured to retrieve the rule from the rules database based on matching the content item to at least one of the content item type identifiers stored in the rules database, matching a field of the content item to at least one of the content item fields stored in the rules database, or matching a keyword or phrase in the content item to at least one of the keywords or phrases stored in the rules database.

In yet another aspect, the control circuitry is further configured to determine a type of the content item; select one of a plurality of independently executable plugins that corresponds to the type of the content item; and activate the selected plugin to perform at least one of the retrieving of the rule, the identifying of the contact-related data, the searching of the contact database, the determining whether the contact entry should be updated, or the updating of the contact entry.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
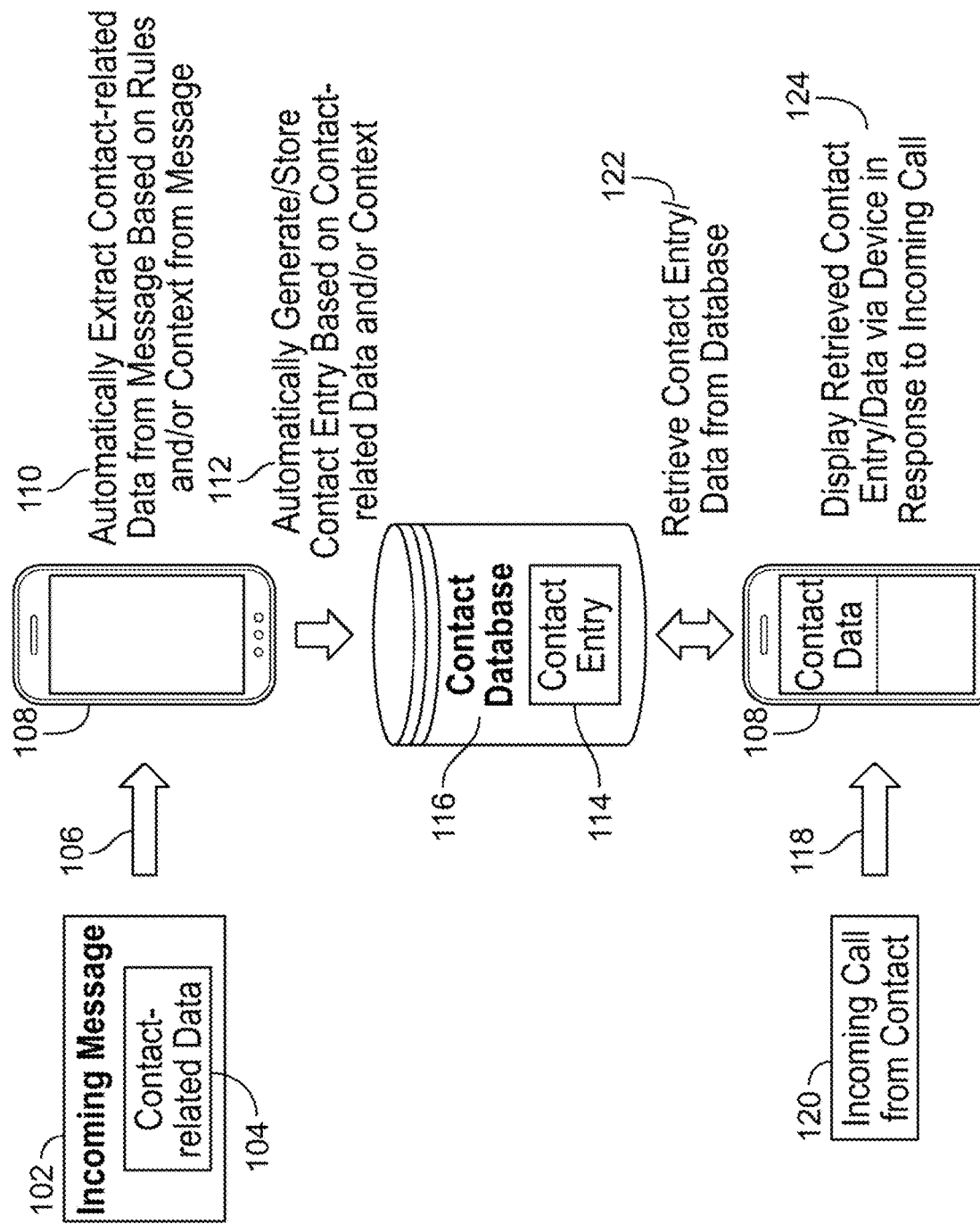
FIG. 1 illustrates an overview of a scenario in which a contact entry is automatically created, in accordance with some embodiments of the disclosure.

FIG. 1 illustrates an overview of a scenario in which a contact entry is automatically created, in accordance with some embodiments of the disclosure. A content item 102 or message, which includes contact-related data 104, is electronically received (106) from a source account at a destination account (neither shown in FIG. 1), accessible by way of electronic communication device 108, such as a smartphone. Example types of the source account and/or the destination account include a telephone account, an email account, a chat account, a mobile application account, and/or a social media account. Example types of content item 102 include a calendar event notice, a mobile application message, a text message, an email message, a chat-based message, and/or a social-media-based message. Automatically, for instance, in response to receiving content item 102, device 108 detects and extracts (110) contact-related data 104 from content item 102 and generates and stores (112) a contact entry 114 in contact database 116 based on contact-related data 104 and/or other obtained or determined contextual information, as described in further detail below. At some time after contact entry 114 has been stored in contact database, device 108 receives (118) an incoming call 120 from the same contact that corresponds to stored contact entry 114. Device 108 automatically retrieves (122) contact entry 114 from contact database 116 and displays (124) contact data, such as a contact identifier that identifies the source, based on the retrieved contact entry 114, informing the receiver of the call that the caller is the source and not an unknown caller, thereby decreasing the chance that the user will ignore the call.

Figure 2:
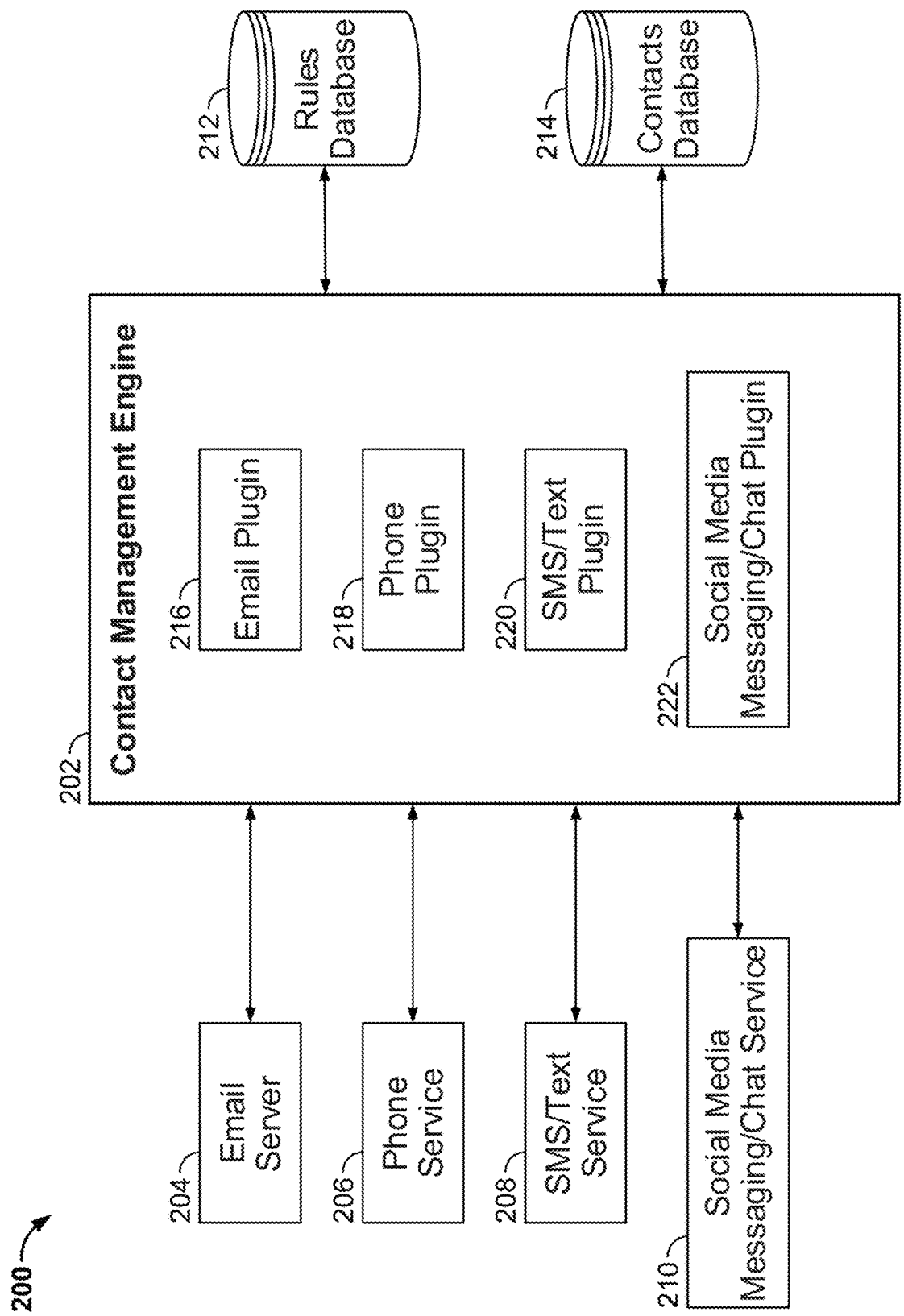
FIG. 2 is an illustrative block diagram showing a system for automatically creating and/or deleting a contact entry, in accordance with some embodiments of the disclosure.

FIG. 2 shows an illustrative block diagram of system 200 for automatically creating and/or deleting contact entries based on content communications and/or context, in accordance with some embodiments of the disclosure. Although FIG. 2 shows system 200 as including a number and configuration of individual components, in some embodiments, any number of the components of system 200 may be combined and/or integrated as one device. System 200 includes contact management engine 202, a number of sources of messages or content items, and a number of databases. Example types of sources (sometimes referred to herein as source accounts) of messages or content items shown in system 200 include email server 204, phone service 206, short messaging system (SMS) and/or text service 208, social media messaging and/or chat service 210. Example types of databases shown in system 200 include rules database 212 and contacts database 214. In various embodiments, contact management engine 202, rules database 212, and/or contacts database 214 may be included within a server and/or within a computing device, such as a smartphone. Contact management engine 202 is communicatively coupled, for instance via one or more communication networks or wired or wireless communication paths, to email server 204, phone service 206, short messaging system (SMS) and/or text service 208, social media messaging and/or chat service 210, rules database 212, and contacts database 214. Each communication network described herein may be any type of communication network, such as the Internet, a mobile phone network, a mobile voice or data network (e.g., a 5G networks), a cable network, or any combination of two or more of such communication networks. Each communication network may include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths.

Contact management engine 202 includes plugins that correspond to the different types of content items that may be communicated by email server 204, phone service 206, short messaging system (SMS) and/or text service 208, social media messaging and/or chat service 210, respectively. In particular, contact management engine 202 includes email plugin 216, phone plugin 218, SMS/text plugin 220, and social media messaging/chat plugin 222. As described in further detail below, each plugin is configured to utilize rules stored in rules database 212 to automatically detect contact-related data included within content items received from their respective types of content item sources, generate a contact entry based on the contact-related data, and store the contact entry in contacts database 214. In some aspects, contact management engine 202 is configured to automatically utilize rules stored in rules database 212 to identify contact deletion trigger-related data in content items received from their respective types of content item sources, generate and store in contacts database 214 a contact deletion trigger based on the contact deletion trigger-related data, and delete the contact entry from contacts database 214 when the contact deletion is triggered.

Figure 3:
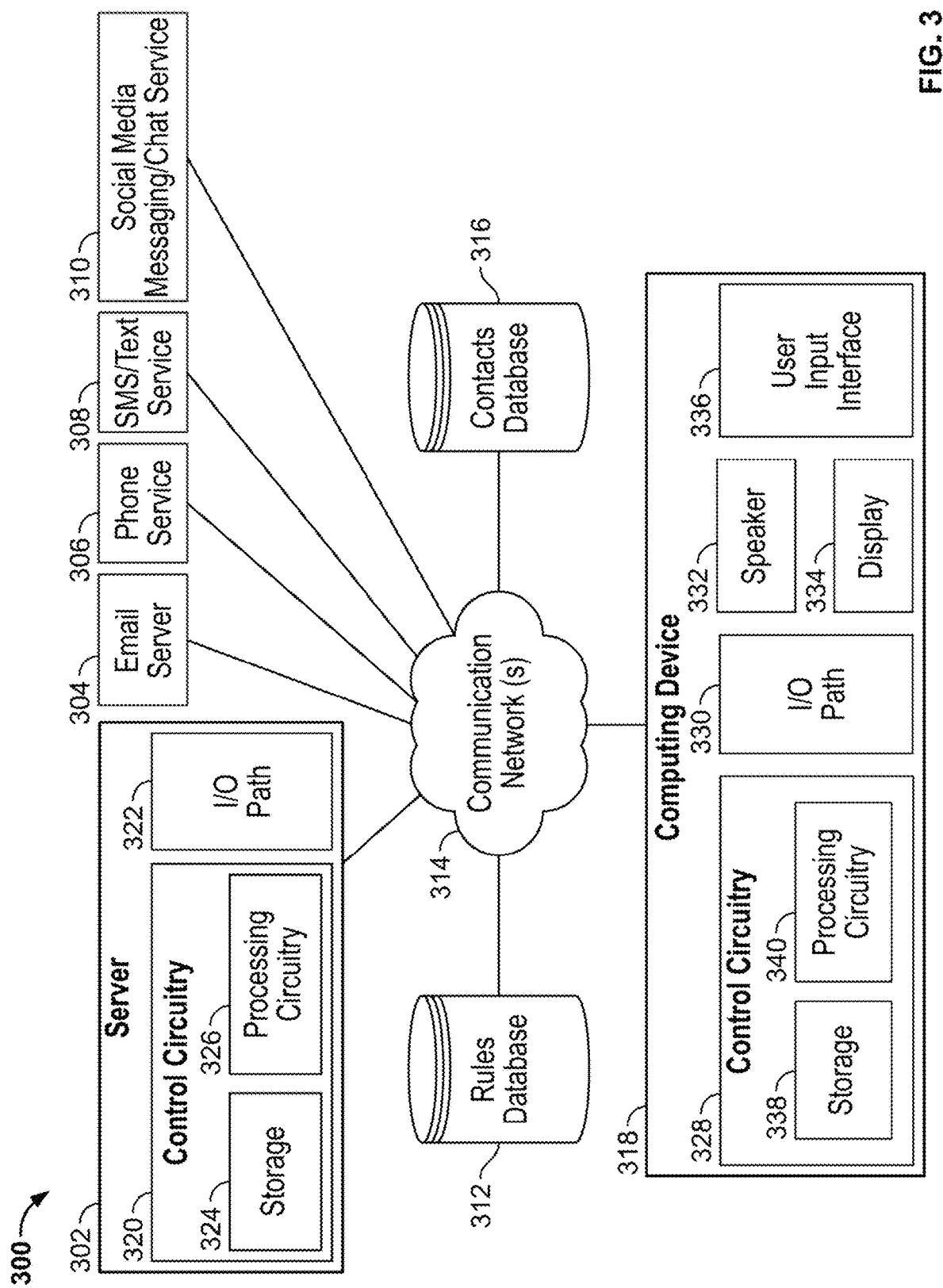
FIG. 3 is an illustrative block diagram showing additional details of the system of FIG. 2, in accordance with some embodiments of the disclosure.

FIG. 3 is an illustrative block diagram showing system 300, which shows additional details of the system 200 of FIG. 2, in accordance with some embodiments of the disclosure. Although FIG. 3 shows certain numbers of components, in various examples, system 300 may include fewer than the illustrated components and/or multiples of one or more illustrated components. System 300 includes server 302, email server 304, phone service 306, SMS/text service 308, social media messaging/chat service 310, rules database 312, contacts database 316, and computing device 318, each of which is communicatively coupled to communication network 314, which may be the Internet or any other suitable network or group of networks. In some embodiments, system 300 excludes server 302 and functionality that would otherwise be implemented by server 302 is instead implemented by other components of system 300, such as computing device 318. In still other embodiments, server 302 works in conjunction with computing device 318 to implement certain functionality described herein in a distributed or cooperative manner.

Server 302 includes control circuitry 320 and I/O path 322, and control circuitry 320 includes storage 324 and processing circuitry 326. Computing device 318, which may be a personal computer, a laptop computer, a tablet computer, a smartphone, or any other type of computing device, includes control circuitry 328, I/O path 330, speaker 332, display 334, and user input interface 336. Control circuitry 328 includes storage 338 and processing circuitry 340. Control circuitry 320 and/or 328 may be based on any suitable processing circuitry such as processing circuitry 326 and/or 340. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 320 and/or control circuitry 328 are configured to implement a contact management engine, such as contact management engine 202, and/or any plugins thereof, each of which is described above in connection with FIG. 2.

Each of storage 324, storage 338, and/or storages of other components of system 300 (e.g., storages of rules database 312, contacts database 316, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 324, storage 338, and/or storages of other components of system 300 may be used to store various types of content, metadata, and or other types of data. Non-volatile memory may also be used (e.g., to launch a boot-up routine and other instructions). Cloud-based storage may be used to supplement storages 324, 338 or instead of storages 324, 338. In some embodiments, control circuitry 320 and/or 328 executes instructions for an application stored in memory (e.g., storage 324 and/or 338). Specifically, control circuitry 320 and/or 328 may be instructed by the application to perform the functions discussed herein. In some implementations, any action performed by control circuitry 320 and/or 328 may be based on instructions received from the application. For example, the application may be implemented as software or a set of executable instructions that may be stored in storage 324 and/or 338 and executed by control circuitry 320 and/or 328. In some embodiments, the application may be a client/server application where only a client application resides on computing device 318, and a server application resides on server 302.

The application may be implemented using any suitable architecture. For example, it may be a stand-alone application wholly implemented on computing device 318. In such an approach, instructions for the application are stored locally (e.g., in storage 338), and data for use by the application is downloaded on a periodic basis (e.g., from an out-of-band feed, from an Internet resource, or using another suitable approach). Control circuitry 328 may retrieve instructions for the application from storage 338 and process the instructions to perform the functionality described herein. Based on the processed instructions, control circuitry 328 may determine what action to perform when input is received from user input interface 336.

In client/server-based embodiments, control circuitry 328 may include communication circuitry suitable for communicating with an application server (e.g., server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 314). In another example of a client/server-based application, control circuitry 328 runs a web browser that interprets web pages provided by a remote server (e.g., server 302). For example, the remote server may store the instructions for the application in a storage device. The remote server may process the stored instructions using circuitry (e.g., control circuitry 320) and/or generate displays. Computing device 318 may receive the displays generated by the remote server and may display the content of the displays locally via display 334. This way, the processing of the instructions is performed remotely (e.g., by server 302) while the resulting displays, such as the display windows described elsewhere herein, are provided locally on computing device 318. Computing device 318 may receive inputs from the user via input interface 336 and transmit those inputs to the remote server for processing and generating the corresponding displays.

A user may send instructions to control circuitry 320 and/or 328 using user input interface 336. User input interface 336 may be any suitable user interface, such as a remote control, trackball, keypad, keyboard, touchscreen, touchpad, stylus input, joystick, voice recognition interface, a gaming controller, or other user input interfaces. User input interface 336 may be integrated with or combined with display 334, which may be a monitor, a television, a liquid crystal display (LCD), electronic ink display, or any other equipment suitable for displaying visual images.

Server 302 and computing device 318 may transmit and receive content and data via input/output (hereinafter "I/O") path 322 and 330, respectively. For instance, I/O path 322 and/or I/O path 330 may include a communication port configured to receive content items from one or more of email server 304, phone service 306, SMS/text service 308, social media messaging/chat service 310 via communication network 314, and/or to communicate contact-related data and the like among rules database 312 and/or contacts database 316. Control circuitry 320, 328 may be used to send and receive commands, requests, and other suitable data using I/O paths 322, 330.

Figure 4:
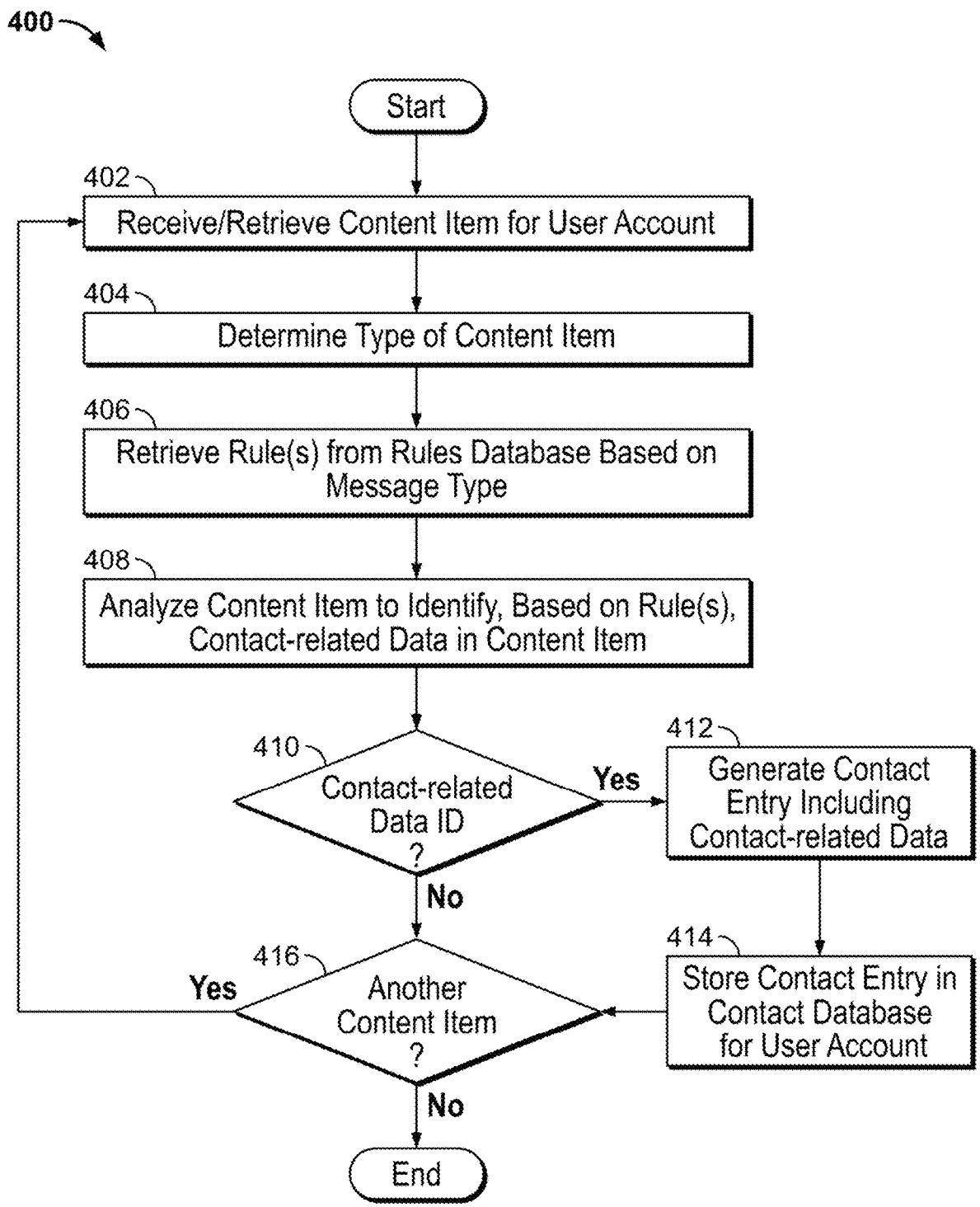
FIG. 4 depicts an illustrative flowchart of a process for automatically creating a contact entry, in accordance with some embodiments of the disclosure.

Having described systems 200 and 300, reference is now made to FIG. 4, FIG. 4 depicts an illustrative flowchart of a process 400 for automatically creating a contact entry, which may be implemented by using system 200 and/or system 300, in accordance with some embodiments of the disclosure. In various embodiments, individual steps of process 400, or any process described herein, may be implemented by one or more components of system 200 and/or system 300. Although the present disclosure may describe certain steps of process 400 (and of other processes described herein) as being implemented by certain components of system 200 and/or system 300, this is for purposes of illustration only, and it should be understood that other components of system 200 and/or system 300 may implement those steps instead.

At 402, control circuitry 328 receives via communication port (e.g., I/O path 330) and communication network 314, a content item communicated from a source account to a destination account. Additionally or alternatively, control circuitry 328 may retrieve the content item via communication network 314 from a cloud storage for the destination account. At 404, control circuitry 328 determines a type of the content item obtained at 402, for instance, by determining a type of source account (e.g., email server 304, phone service 306, SMS/text service 308, social media messaging/chat service 310) from which the content item was obtained.

Figure 5:
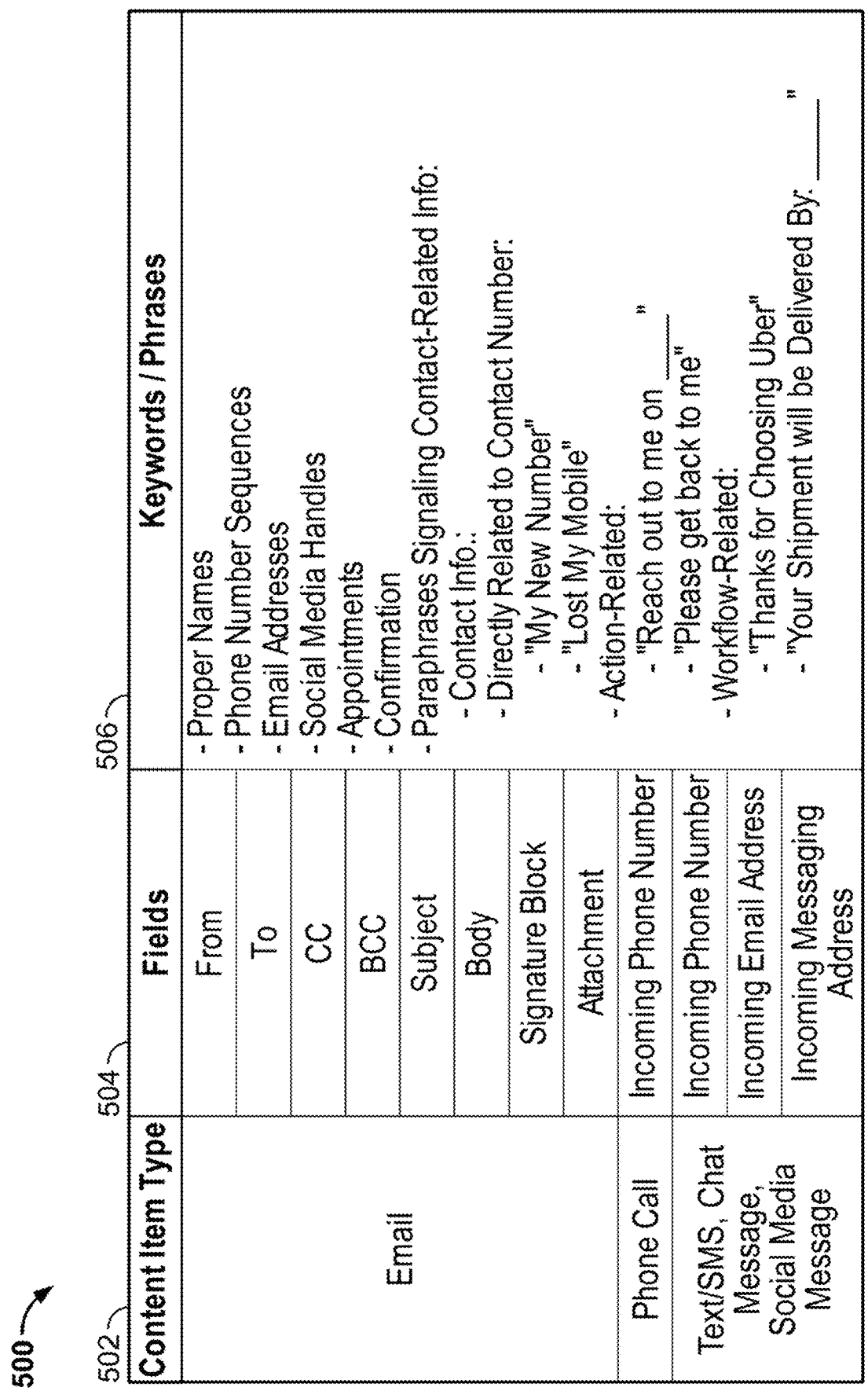
FIG. 5 depicts an example data structure of a rules database, in accordance with some embodiments of the disclosure.

At 406, based on the type of content item determined at 404, control circuitry 328 retrieves one or more rules from rules database 312, which is configured to store rules defining criteria for identifying contact-related data within content items. FIG. 5 depicts an example data structure 500 of rules database 312, in accordance with some embodiments of the disclosure. In one example, the rules identify content item types 502, one or more fields 504 of the types of content items, and one or more keyword terms and/or phrases 506 that, if present within a content item, signal presence of contact-related data within the content item. In such an example, control circuitry 328 may be configured to analyze content items by searching the one or more fields 504 of the particular type 502 of content item for the one or more terms or phrases 506. In some examples, at 406, control circuitry 328 retrieves a rule from rules database 312 based on matching the content item received at 402 to at least one of the content item type identifiers 502 stored in the rules database, matching a field of the received content item to at least one of the content item fields 504 stored in the rules database, and/or matching a keyword or phrase in the received content item to at least one of the keywords or phrases 506 stored in the rules database.

At 408, control circuitry 328 analyzes the content item received at 402 to identify, based on the rule(s) retrieved at 406, any contact-related data that may be included within the content item. In some examples, control circuitry 328 may be configured to determine a type of the content item (404), select one of multiple independently executable plugins (for instance, email plugin 216, phone plugin 218, SMS/text plugin 220, and social media messaging/chat plugin 222 described in connection with FIG. 2) that corresponds to the type of the content item, and activate the selected plugin to retrieve the rule (406), identify and extract the contact-related data (410), generate (412) the contact entry, and/or store (414) the contact entry.

At 410, control circuitry 328 determines whether any contact-related data has been identified at 408 within the content item received at 402. If control circuitry 328 determines that contact-related data has been identified at 408 within the content item received at 402 ("Yes" at 410), then at 412 control circuitry 328 generates a contact entry including and/or based on the identified contact-related data. In some examples, in response to identifying the contact-related data within the content item, control circuitry 328 may automatically extract the contact-related data from the content item, generate, based on the extracted contact-related data, a contact entry corresponding to the source account, and store, at 414, for the destination account, the contact entry in contact database 316. In another example, control circuitry 328 is configured to identify (408), based on the rule(s) retrieved at 406, contextual information in the content item, and add a context identifier to the contact entry based on the contextual information. The contextual information may, for example, comprise an identifier of a service provider scheduled to provide a service, in which case the context identifier may include an identifier of the service provider or of a type of the service. In a further aspect, based on the contextual information, control circuitry 328 may be configured to search a second source for additional contact-related data corresponding to the source account and store the additional contact-related data in the contact entry. In instances where the contextual information includes an identifier of a service provider, control circuitry 328 may be configured to search the second source by searching a website of the service provider.

In some aspects, instead of or in addition to generating (412) and storing (414) a contact entry in contacts database 316, control circuitry 328 is configured to update an already existing contact entry, if warranted based on contact-related data identified at 410. For instance, control circuitry 328 may, in response to identifying the contact-related data within the content item at, 410, automatically search, based on the contact-related data, contacts database 316 for the contact entry that corresponds to the source account; determine whether the contact entry should be updated based on the contact-related data (for example, if the contact-related data includes information not already included in the stored contact entry or information that supersedes information already included in the stored contact entry); and in response to determining that the contact entry should be updated, update the contact entry in contacts database 316 based on the contact-related data. Control circuitry 328 may, for instance, update the contact entry by overwriting one or more fields of the contact entry with at least a portion of the contact-related data. As another example, control circuitry 328 may be further configured to search, based on the contact-related data, an archived contact database (not expressly shown in the figures), such as a cloud-based archive and/or an archive locally stored on computing device 318 (for instance, in storage 338), for the contact entry that corresponds to the source account. In such aspects, the updating of the contact entry in the contact database may include retrieving an item of data (e.g., one or more data fields for the contact entry) from the contact entry in the archived contact database and storing the retrieved item of data in the contact entry in the contact database.

Figure 6:
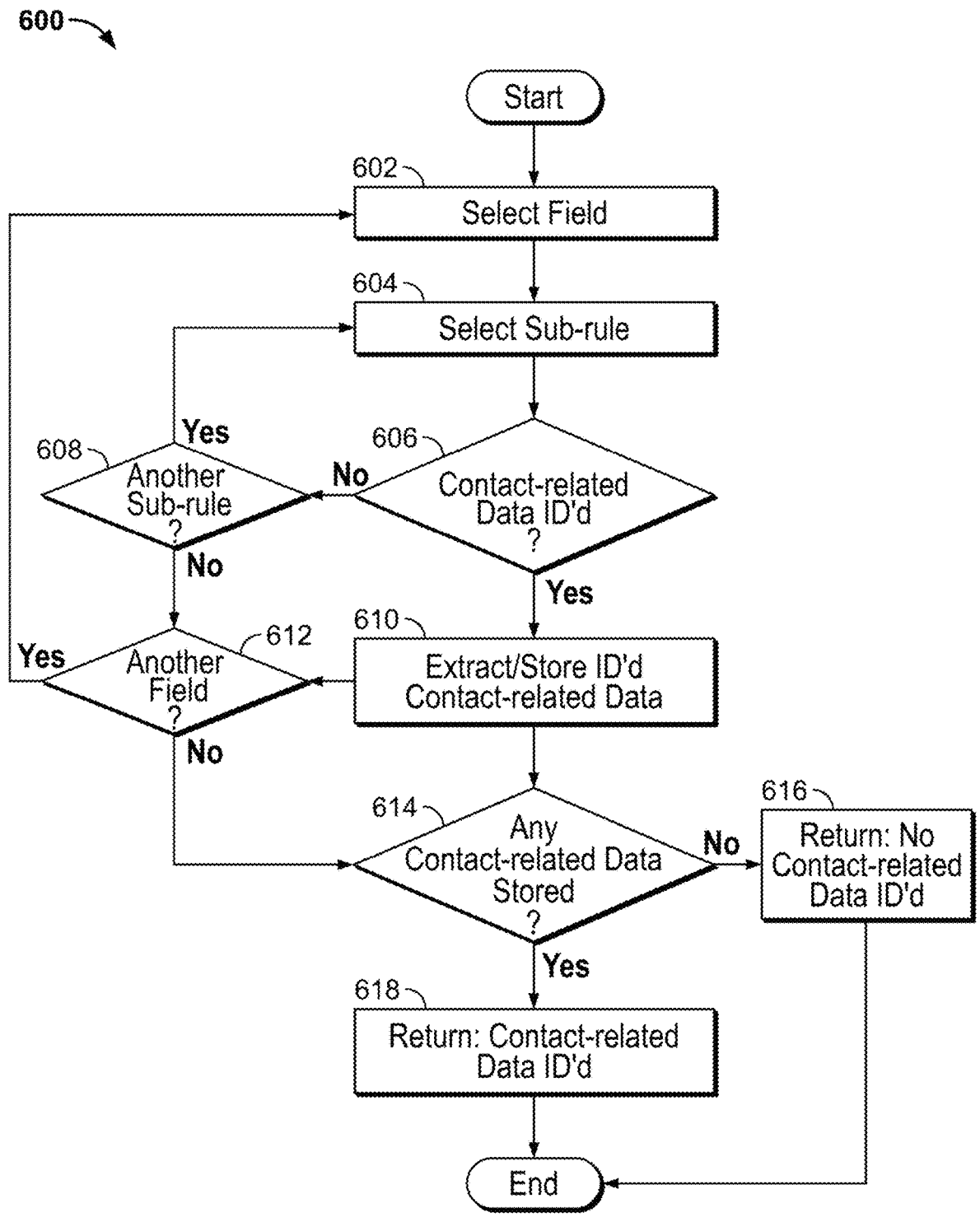
FIG. 6 depicts an illustrative flowchart of a process for identifying contact-related data within a content item, in accordance with some embodiments of the disclosure.

FIG. 6 depicts an illustrative flowchart of process 600 for identifying contact-related data within a content item, in accordance with some embodiments of the disclosure. At 602, control circuitry 328 selects a field of a content item, such as a field 504 (FIG. 5) of the content item received at 402 (FIG. 4) for processing. At 604, control circuitry 328 selects a rule and/or sub-rule from rules database 312, such as an example keyword or phrase 506 for which the content item is to be searched. At 606, based on the field and rule/sub-rule selected at 602 and 604, control circuitry 328 determines whether the content item includes any contact-related data. If control circuitry 328 determines that the content item does not include any contact-related data ("No" at 606), then at 608, control circuitry 328 determines whether rules database 312 includes another rule and/or sub-rule applicable to the content item type and/or field being processed. If control circuitry 328 determines that rules database 312 includes no other rule and/or sub-rule remains to be processed ("No" at 608), then control passes to 612, at which control circuitry 328 determines whether the content item includes another field to be processed. If control circuitry 328 determines that rules database 312 includes another rule and/or sub-rule to be processed ("Yes" at 608), then control passes back to 604 to select that rule/sub-rule for processing and control passes back to 606. If, at 612, control circuitry 328 determines that content item includes another field to be processed ("Yes" at 612), then control passes back to 602 to select that field for processing. If control circuitry 328 determines that content item includes no other field to be processed ("No" at 612), then control passes to 614, which is described below.

Referring back to 606, if control circuitry 328 determines that the content item includes contact-related data ("Yes" at 606), then at 610, after the content item has been analyzed utilizing all applicable fields, rules, and/or sub-rules, control circuitry 328 extracts and stores the identified contact-related data, and/or some derivative thereof, in contacts database 316. At 614, control circuitry 328 searches contacts database 316 to determine whether any contact-related data has been stored for the content item. If control circuitry 328 determines that contact-related data has been stored for the content item in contacts database 316 ("Yes" at 614), indicating that control was passed to 614 from 610, then at 618 control circuitry 328 returns data indicating that contact-related data has been identified based on the content item and process 600 terminates. If, on the other hand, control circuitry 328 determines that no contact-related data has been stored in contacts database 316 for the content item ("No" at 614), indicating that control was passed to 614 from 612, then at 616 control circuitry 328 returns data indicating that no contact-related data has been identified based on the content item and process 600 terminates.

Figure 7:
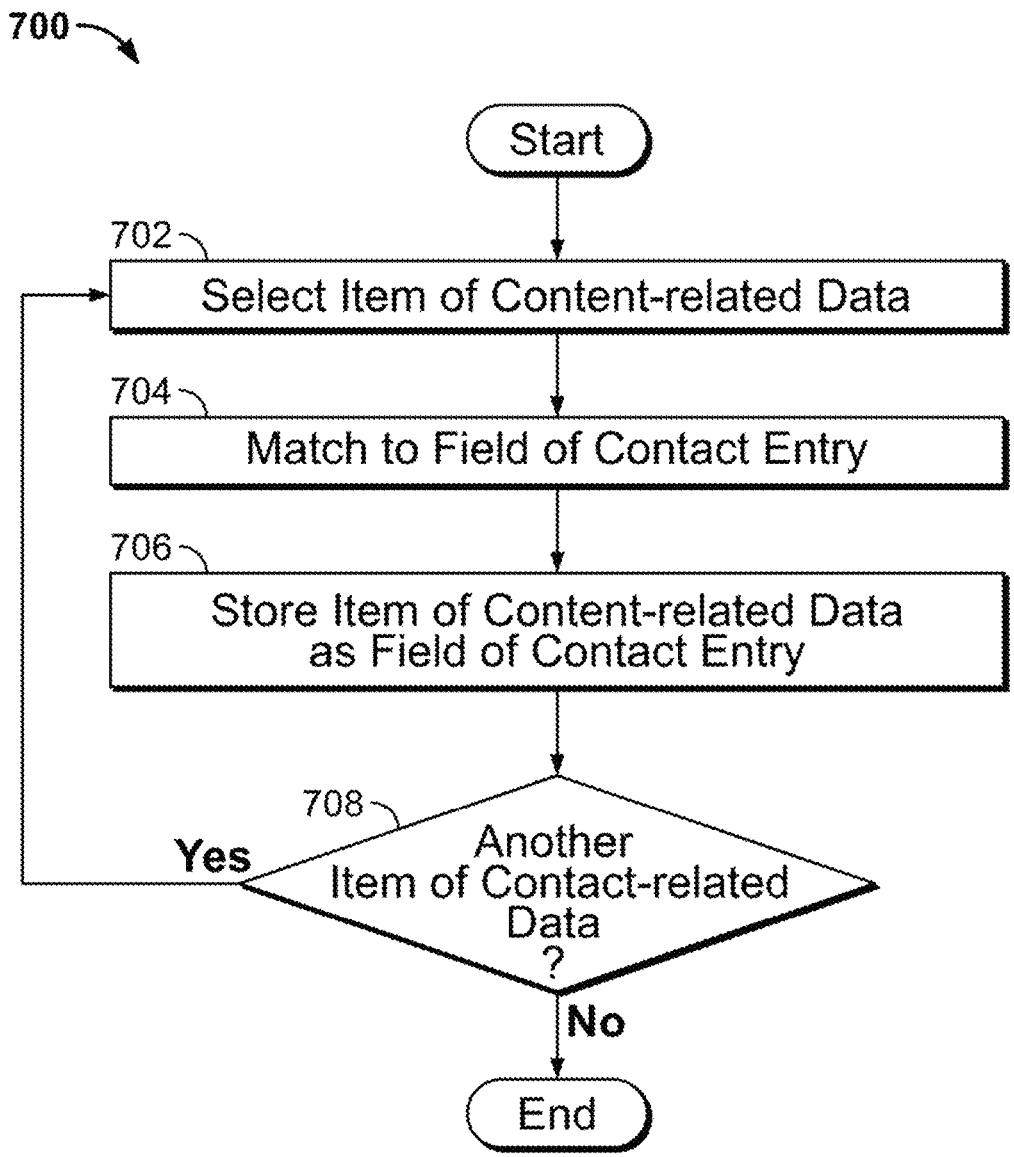
FIG. 7 depicts an illustrative flowchart of a process for generating a contact entry based on items of contact-related data extracted from a content item, in accordance with some embodiments of the disclosure.

FIG. 7 depicts an illustrative flowchart of process 700 for generating a contact entry based on items of contact-related data extracted from a content item, in accordance with some embodiments of the disclosure. At 702, control circuitry 328 selects an item of content-related data, which may have been extracted from a content item at 610 (FIG. 6). At 704, control circuitry 328 matches, for instance based on rules stored in rules database 312, the item of content-related data, such as a contact name, to a corresponding contact entry field within which the item is to be stored. At 706, control circuitry 328 stores the item of contact-related data selected at 702 in contacts database 316 in the contact entry field matched at 704. In some aspects, the storing of the item of contact-related data at 706 may include updating one or more existing contact entry fields in the manner described above. At 708, control circuitry 328 determines whether another item of contact-related data has been extracted from the content item and remains to be processed. If control circuitry 328 determines that an additional item of contact-related data has been extracted from the content item and remains to be processed ("Yes" at 708), then control passes back to 702 to process the additional item of content in the manner described above. If, on the other hand, control circuitry 328 determines that no additional item of contact-related data has been extracted from the content item that remains to be processed ("No" at 708), then process 700 terminates.

In some aspects, instead of or in addition to automatically identifying/extracting contact-related data from a content item and generating a contact as described above in connection with 410 and 412, respectively (FIG. 4), control circuitry 328 is configured to automatically identify and extract contact deletion trigger-related data from a content item and generates a contact deletion trigger for a contact entry. For instance, control circuitry 328 may be configured to receive, via a communication port (e.g., I/O path 330) and communication network 314, a content item communicated from a source account (e.g., from one or more of email server 304, phone service 306, SMS/text service 308, and/or social media messaging/chat service 310) to a destination account (e.g., an account accessible via computing device 318). Control circuitry 328 generates, based on the content item, a contact deletion trigger defining a criterion for deleting a contact entry that identifies the source account and is stored for the destination account in contact database 316. Then, based on the contact deletion trigger, control circuitry 328 determines whether the criterion for deleting the contact entry has been met. In response to determining that the criterion for deleting the contact entry has been met, control circuitry 328 is configured to automatically cause the contact entry to be deleted from contact database 316. In another example, control circuitry 328 is configured to, in response to determining that the criterion for deleting the contact entry has been met, automatically cause the contact entry to be deleted from a plurality of contact databases 316 that are stored for the destination account in at least one of a cloud storage or a local computing device storage.

In still another example, control circuitry 328 is configured to retrieve, from rules database 312, a rule defining criteria for identifying contact deletion trigger-related data within the content item. Based on the rule, control circuitry 328 identifies the contact deletion trigger-related data within the content item, and the contact deletion trigger is generated based on the contact deletion trigger-related data identified within the content item. In one aspect, the rule identifies one or more fields (e.g., fields 504) of the content item and one or more terms or phrases (e.g., terms or phrases 506) the presence of which in a content item signals the presence of contact deletion trigger-related data. In such an aspect, control circuitry 328 may identify the contact deletion trigger-related data within the content item by searching the one or more fields 504 of the content item for the one or more terms or phrases 506. In a further aspect, control circuitry 328 is configured to match, based on the content item, the source account to the contact entry that identifies the source account and is stored for the destination account in the contact database 316.

In a further aspect, the contact deletion trigger is a time-based trigger, and the control circuitry is configured to determine whether the criterion for deleting the contact entry has been met by determining whether a current time as reached a contact entry deletion time. As another example, the contact deletion trigger may be an action-based trigger, in which case the control circuitry may be configured to determine whether the criterion for deleting the contact entry has been met by determining whether an action has occurred. For instance, control circuitry 328 may be configured to identify a date and/or a time within the content item. Then, based on the date and/or the time, control circuitry 328 generates, as the criterion for deleting the contact entry, a day and/or a time for deleting the contact entry. As another example, control circuitry 328 may be configured to identify, based on the content item, a service (e.g., a painting service, a transportation service, a package delivery service, a plumbing service, and/or the like) to be provided by a service provider. In such an example, control circuitry 312 may be configured to determine whether the criterion for deleting the contact entry has been met by determining, based on a confirmation message, whether the service has been provided.

Figure 8:
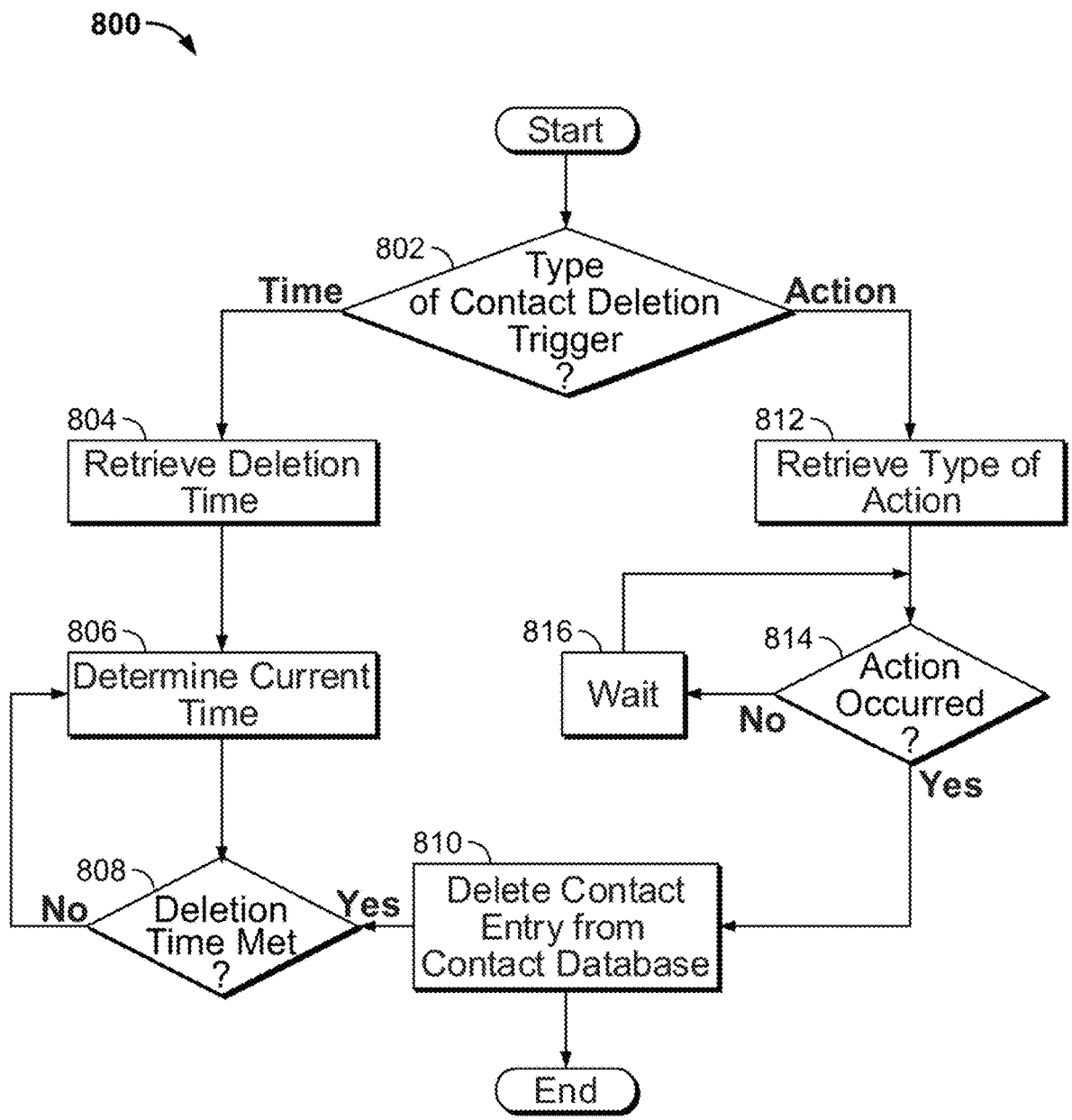
FIG. 8 depicts an illustrative flowchart of a process for automatically deleting a contact entry based on a contact deletion trigger, in accordance with some embodiments of the disclosure.

FIG. 8 depicts an illustrative flowchart of process 800 for automatically deleting a contact entry based on a contact deletion trigger, in accordance with some embodiments of the disclosure. At 802, control circuitry 328 determines a type of the contact deletion trigger (e.g., a time-based deletion trigger or an action-based deletion trigger) that has been generated and/or stored in contacts database 316 for a particular contact entry. If control circuitry 328 determines that a time-based deletion trigger has been generated and/or stored in contacts database 316 for the contact entry ("Time" at 802), then control passes to 804. If, on the other hand, control circuitry 328 determines that an action-based deletion trigger has been generated and/or stored in contacts database 316 for the contact entry ("Action" at 802), then control passes to 812.

At 804, control circuitry 328 retrieves a deletion day and/or time, for instance, which may be stored in contacts database 316 as a criterion for deleting the contact entry. At 806, control circuitry 328 determines a current day and/or time, for instance, based on a computer clock (not shown in the figures). At 808, control circuitry 328 determines whether the deletion day and/or time have been met (e.g., whether the current day and/or time meets the deletion criterion day and/or time). If control circuitry 328 determines that the deletion day and/or time have been met ("Yes" at 808), then at 810 control circuitry 328 deletes the contact entry from contacts database 316. If, on the other hand, control circuitry 328 determines that the deletion day and/or time have not been met ("No" at 808), then control passes back to 806 repeat the day and/or time check in the manner described above. Although the present disclosure discusses deleting contact entries, the disclosure is similarly applicable to archiving contact entries instead of or in addition to deleting contact entries. For instance, in some examples, instead of or in addition to deleting a contact entry, control circuitry 328 archives the contact entry at 810, such as by moving the contact entry from contacts database 316 to an archive, which may be implemented by cloud-based storage (not separately shown in the figures) external to computing device 318.

At 812, control circuitry 328 retrieves a type of action which may be stored in contacts database 316 as a criterion for deleting the contact entry. At 814, control circuitry 328 determines whether the specified criterion action (e.g., delivery of a package) has occurred, for instance, based on whether a confirmation message has been received from a service provider. If control circuitry 328 determines that the specified action has occurred ("Yes" at 814), then at 810 control circuitry 328 deletes the contact entry from contacts database 316. If, on the other hand, control circuitry 328 determines that the specified action has occurred ("No" at 814), then control passes back to 814 to repeat the action occurrence check in the manner described above.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automated contact generation based on content communications, the method comprising:
   receiving a content item electronically communicated from a source account to a destination account;
   determining a content item type identifier of the content item electronically communicated from the source account to the destination account;
   retrieving a rule from a rules database, wherein the rule is based on the content item type identifier of the content item electronically communicated from the source account to the destination account and defines criteria for identifying contact-related data within the content item electronically communicated from the source account to the destination account;
   identifying, based on the rule, a content item field within the content item, wherein a field type of the content item field matches a contact-related data type; and
   in response to identifying the content item field within the content item, automatically:
      extracting the contact-related data from the content item field of the content item;
      generating, based on the extracted contact-related data, a contact entry corresponding to the source account; and
      storing, for the destination account, the contact entry in a contact database.

2. The method of claim 1, further comprising:
   identifying, based on the rule, contextual information in the content item; and
   adding a context identifier to the contact entry based on the contextual information.

3. The method of claim 2, wherein the contextual information comprises an identifier of a service provider scheduled to provide a service, and wherein the context identifier comprises an identifier of the service provider or of a type of the service.

4. The method of claim 1, further comprising:
   identifying, based on the rule, contextual information in the content item;
   based on the contextual information, searching a second source for additional contact-related data corresponding to the source account; and
   storing the additional contact-related data in the contact entry.

5. The method of claim 4, wherein the contextual information comprises an identifier of a service provider, and wherein the searching the second source comprises searching a website of the service provider.

6. The method of claim 1, wherein the rule identifies one or more fields of the content item and one or more terms or phrases that signal presence of contact-related data, wherein the analyzing the content item comprises searching the one or more fields of the content item for the one or more terms or phrases.

7. The method of claim 1, further comprising:
storing, in the rules database, content item type identifiers, content item fields for each of the content item type identifiers, and keywords or phrases for each of the content item fields,
wherein the retrieving of the rule from the rules database is performed based on matching the content item to at least one of the content item type identifiers stored in the rules database, matching a field of the content item to at least one of the content item fields stored in the rules database, or matching a keyword or phrase in the content item to at least one of the keywords or phrases stored in the rules database.

8. The method of claim 1, further comprising:
selecting one of a plurality of independently executable plugins that corresponds to the content item type identifier of the content item; and
activating the selected plugin to perform at least one of the retrieving of the rule, the identifying of the contact-related data, the extracting of the contact-related data, the generating the contact entry, or the storing the contact entry.

9. The method of claim 1, further comprising:
receiving, at a computing device after the content item has been electronically communicated from the source account to the destination account, a message from the source account to the destination account, wherein the message comprises at least one of an email message, a text message, a chat message, or a telephone call; and
generating, for display via the computing device, the contact entry as an identifier of the source account.

10. The method of claim 1, wherein the content item comprises at least one of a calendar event notice, a mobile application message, a text message, an email message, a chat-based message, or a social-media-based message, and wherein at least one of the source account or the destination account comprise at least one of a telephone account, an email account, a chat account, a mobile application account, or a social media account.

11. A system for automated contact generation based on content communications, the system comprising:
a communication port configured to:
receive, via a communication network, a content item communicated from a source account to a destination account; and
determine a content item type identifier of the content item electronically communicated from the source account to the destination account;
a rules database configured to store a rule based on the content item type identifier of the content item electronically communicated from the source account to the destination account and defining criteria for identifying contact-related data within the content item electronically communicated from the source account to the destination account;
a contact database; and
control circuitry configured to:
retrieve the rule from the rules database;
identify, based on the rule, a content item field within the content item, wherein a field type of the content item field matches a contact-related data type; and
in response to identifying the content item field within the content item, automatically:
extract the contact-related data from the content item field of the content item;
generate, based on the extracted contact-related data, a contact entry corresponding to the source account; and
store, for the destination account, the contact entry in the contact database.

12. The system of claim 11, wherein the control circuitry is further configured to:
identify, based on the rule, contextual information in the content item; and
add a context identifier to the contact entry based on the contextual information.

13. The system of claim 12, wherein the contextual information comprises an identifier of a service provider scheduled to provide a service, and wherein the context identifier comprises an identifier of the service provider or of a type of the service.

14. The system of claim 11, wherein the control circuitry is further configured to:
identify, based on the rule, contextual information in the content item;
based on the contextual information, search a second source for additional contact-related data corresponding to the source account; and
store the additional contact-related data in the contact entry.

15. The system of claim 14, wherein the contextual information comprises an identifier of a service provider, and wherein the control circuitry is further configured to search the second source by searching a website of the service provider.

16. The system of claim 11, wherein the rule identifies one or more fields of the content item and one or more terms or phrases that signal presence of contact-related data, wherein the control circuitry is further configured to analyze the content item by searching the one or more fields of the content item for the one or more terms or phrases.

17. The system of claim 11, wherein the control circuitry is further configured to:
store, in the rules database, content item type identifiers, content item fields for each of the content item type identifiers, and keywords or phrases for each of the content item fields,
wherein the control circuitry is further configured to retrieve of the rule from the rules database based on matching the content item to at least one of the content item type identifiers stored in the rules database, matching a field of the content item to at least one of the content item fields stored in the rules database, or matching a keyword or phrase in the content item to at least one of the keywords or phrases stored in the rules database.

18. The system of claim 11, wherein the control circuitry is further configured to:
select one of a plurality of independently executable plugins that corresponds to the content item type identifier of the content item; and
activate the selected plugin to perform at least one of the retrieving of the rule, the identifying of the contact-related data, the extracting of the contact-related data, the generating the contact entry, or the storing the contact entry.

19. The system of claim 11, wherein the control circuitry is further configured to:
   receive, at a computing device after the content item has been electronically communicated from the source account to the destination account, a message from the source account to the destination account, wherein the message comprises at least one of an email message, a text message, a chat message, or a telephone call; and
   generate, for display via the computing device, the contact entry as an identifier of the source account.

* * * * *